US010524422B2

(12) United States Patent
Brimeyer et al.

(10) Patent No.: US 10,524,422 B2
(45) Date of Patent: Jan. 7, 2020

(54) HARVESTING HEAD CONSTANT FORCE ASSEMBLY

(71) Applicant: Deere & Company, Moline, IL (US)

(72) Inventors: Alex Brimeyer, Bettendorf, IA (US); Michael L. Vandeven, Princeton, IA (US)

(73) Assignee: DEERE & COMPANY, Moline, IL (US)

( * ) Notice: Subject to any disclaimer, the term of this patent is extended or adjusted under 35 U.S.C. 154(b) by 37 days.

(21) Appl. No.: 15/499,939

(22) Filed: Apr. 28, 2017

(65) Prior Publication Data
US 2018/0310476 A1 Nov. 1, 2018

(51) Int. Cl.
A01D 41/14 (2006.01)
A01D 41/06 (2006.01)

(52) U.S. Cl.
CPC .......... A01D 41/145 (2013.01); A01D 41/06 (2013.01)

(58) Field of Classification Search
CPC ...... A01D 41/145; A01D 41/06; A01D 41/14; A01D 41/141; A01D 47/00; A01B 59/064
USPC ........................................................ 56/15.6
See application file for complete search history.

(56) References Cited

U.S. PATENT DOCUMENTS

| 3,958,399 | A | * | 5/1976 | Schoeneberger | ...... | A01D 41/14 56/15.8 |
| 3,959,957 | A | * | 6/1976 | Halls | ...................... | A01D 41/14 56/208 |
| 4,085,571 | A | * | 4/1978 | Mortier | ................... | A01D 41/14 56/208 |
| 4,206,584 | A |  | 6/1980 | Johnson et al. |  |  |
| 4,724,661 | A | * | 2/1988 | Blakeslee | ............. | A01D 43/107 56/15.8 |
| 5,046,230 | A | * | 9/1991 | Hurlburt | ............... | A01D 41/145 29/426.1 |
| 5,157,905 | A | * | 10/1992 | Talbot | .................... | A01D 41/14 56/15.9 |
| 5,327,709 | A | * | 7/1994 | Webb | ..................... | A01D 41/14 56/14.4 |
| 5,535,578 | A | * | 7/1996 | Honey | .................. | A01D 41/145 56/14.9 |

(Continued)

FOREIGN PATENT DOCUMENTS

| CA | 2624556 C | * | 9/2015 | ........... A01D 41/141 |
| CN | 105025699 A |  | 11/2015 |  |
| DE | 19602222 A1 | * | 7/1997 | ........... A01D 41/145 |

OTHER PUBLICATIONS

European Patent Office Extended Search Report for Application No. 18169496.9 dated Oct. 11, 2018 (6 pages).

Primary Examiner — Robert E Pezzuto
Assistant Examiner — Adam J Behrens
(74) Attorney, Agent, or Firm — Michael Best & Friedrich LLP

(57) ABSTRACT

An agricultural harvesting head for an agricultural harvester has a constant force assembly that changes the mechanical advantage of a spring applied to the mainframe of the agricultural harvesting head. As the mainframe of the agricultural harvesting head moves up and down on the front of the combine feederhouse, compressing and decompressing the spring, the constant force assembly changes the mechanical advantage of the spring such that the spring provides a relatively constant lifting force to the mainframe of the harvesting head as the mainframe moves up and down.

9 Claims, 9 Drawing Sheets

(56) References Cited

U.S. PATENT DOCUMENTS

| | | | | |
|---|---|---|---|---|
| 6,675,568 B2* | 1/2004 | Patterson | ............... | A01D 41/14 56/208 |
| 7,430,846 B2* | 10/2008 | Bomleny | ............. | A01D 41/141 56/10.2 E |
| 7,661,251 B1* | 2/2010 | Sloan | ................... | A01D 41/141 56/10.2 E |
| 8,745,964 B2 | 6/2014 | Patterson et al. | | |
| 9,795,084 B2* | 10/2017 | Carpenedo | ............. | A01D 41/16 |
| 2003/0074876 A1* | 4/2003 | Patterson | ............... | A01D 41/14 56/257 |
| 2006/0254234 A1* | 11/2006 | Bomleny | ............. | A01D 41/141 56/10.2 E |
| 2007/0214760 A1* | 9/2007 | Bomleny | ............. | A01D 41/141 56/10.2 E |
| 2016/0183461 A1* | 6/2016 | Neudorf | ................ | A01D 41/14 56/158 |

\* cited by examiner

HARVESTING HEAD CONSTANT FORCE ASSEMBLY

FIELD OF THE INVENTION

This invention relates generally to agricultural harvesters. More particularly it relates to agricultural harvesting heads. More particularly it relates to agricultural harvesting heads for agricultural combines.

BACKGROUND OF THE INVENTION

Agricultural harvesters, such as agricultural combines, are designed to travel through agricultural fields harvesting crops. Agricultural combines receive crop severed from the ground and convey it to threshing, separating and cleaning devices within the agricultural combine. In a typical arrangement, the agricultural harvesting head severs the crop from the ground and conveys it to the central region of the harvesting head where it is then conveyed rearward into a central and forwardly opening aperture in the front of the agricultural combine proper.

Agricultural harvesting heads are quite long, on the order of 10-15 m in overall length. In order to accurately follow the contours of the ground and sever crop at the appropriate point on the stem, agricultural harvesting heads have been made in sections that are generally hinged with respect to each other. A typical agricultural harvesting head of this type is formed in two or three sections that are pivotable with respect to each other. They pivot with respect to each other about a generally horizontal and fore-and-aft extending axis. Thus, a two section agricultural harvesting head would have one pivot axis, and a three-section agricultural harvesting head would have two pivot axes.

To better follow the contours of the ground, the agricultural harvesting head is mounted to the front of the feederhouse such that it can move with respect to the feeder house.

In one arrangement (U.S. Pat. No. 6,675,568 B2) the agricultural harvesting head is a draper head having three frame sections (a center section, a left-wing section and a right wing section). In this arrangement each of the wing sections are hinged with respect to the center section about two pivot joints with pivot pins (see: FIG. 6, items 17H, 27; FIG. 20, items 71A, 71B). The pivot joints permit the left wing section and the right wing section to pivot up and down with respect to the center frame section and thereby follow the contours of the ground.

In addition to that contour-following capability, the center frame section is mounted on an "adapter" that is fixed to the front of the feederhouse. This adapter permits the center frame section to move up and down with respect to the front of the feederhouse. It also permits the wing sections to move up and down with respect to the front of the feederhouse, since they are attached to and supported on the center frame section.

A spring-loaded support assembly is coupled between the adapter frame and the center frame section to hold the center frame section up in the air at an optimum cutting height with respect to the adapter. As the ground moves up and down, the spring-loaded support assembly provides a lifting force to transfer the weight to the feederhouse of the combine. Unfortunately, this lifting force varies depending on the position of the center section with respect to the feederhouse. The lower the center frame section is with respect to the adapter and the feederhouse, the more weight is transferred to the adapter and feederhouse and the smaller the force applied to the ground. The higher the center frame section is with respect to the adapter and the feederhouse, the smaller the weight is transferred to the adapter and feederhouse and the more weight is applied to the ground.

SUMMARY OF THE INVENTION

In accordance with a first aspect of the invention, an agricultural harvesting head for an agricultural harvester is provided, where the agricultural harvester has a feederhouse extending forward from the front of the agricultural harvester and wherein the feederhouse is configured to support the agricultural harvesting head on forward end of the feederhouse, the agricultural harvesting head comprising an elongate mainframe extending laterally and perpendicular to a direction of travel ("V") of the agricultural harvester when harvesting crops, wherein the elongate mainframe has a first central aperture through which cut crop material is passed; an adapter frame disposed behind the center frame section, wherein the adapter frame is configured to be removably coupled to and supported on the front end of the feederhouse and wherein the adapter frame has a second central aperture configured to receive the cut crop from the first central aperture and to communicate the cut crop into a front opening of the feederhouse; a plurality of links coupling the mainframe and the adapter frame to permit the mainframe to move up and down with respect to the adapter frame through a plurality of relative positions between the adapter frame and the mainframe; and a constant force assembly configured to apply a constant lifting force to the elongate mainframe as it travels through the plurality relative positions.

The constant force assembly may be coupled to the adapter frame and to the mainframe and may communicate a lifting force from the adapter frame to the mainframe.

The constant force assembly may comprise at least one spring having a first end coupled to the adapter frame, and a second end coupled to a first end of a scissor link assembly.

A second end of the scissor link assembly may be coupled to the mainframe.

The scissor link assembly may be configured to change the mechanical advantage of the spring that is applied to the mainframe.

A change in compression of the spring may adjust the scissor link assembly.

The change in compression of the spring may be an increase in compression of the spring and the increase in compression of the spring may adjust the scissor link assembly to reduce the mechanical advantage of the spring acting upon the mainframe.

The change in compression of the spring may be a decrease in compression of the spring and the decrease in compression of the spring may adjust the scissor link assembly to increase the mechanical advantage of the spring acting upon the mainframe.

DETAILED DESCRIPTION OF THE PREFERRED EMBODIMENTS

Figure 1:
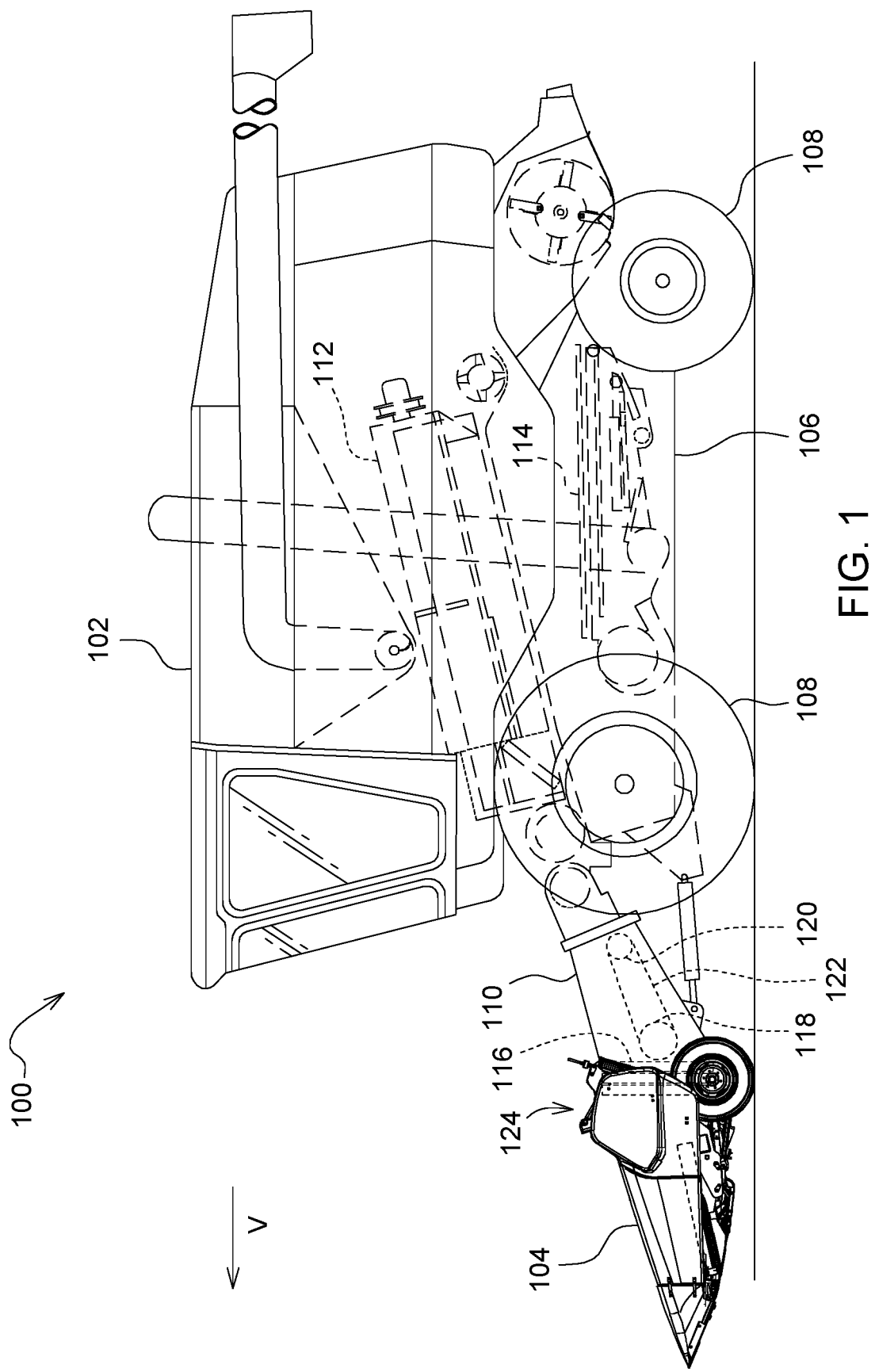
FIG. 1 illustrates an agricultural harvester in side view in accordance with the present invention.
Figure 2:
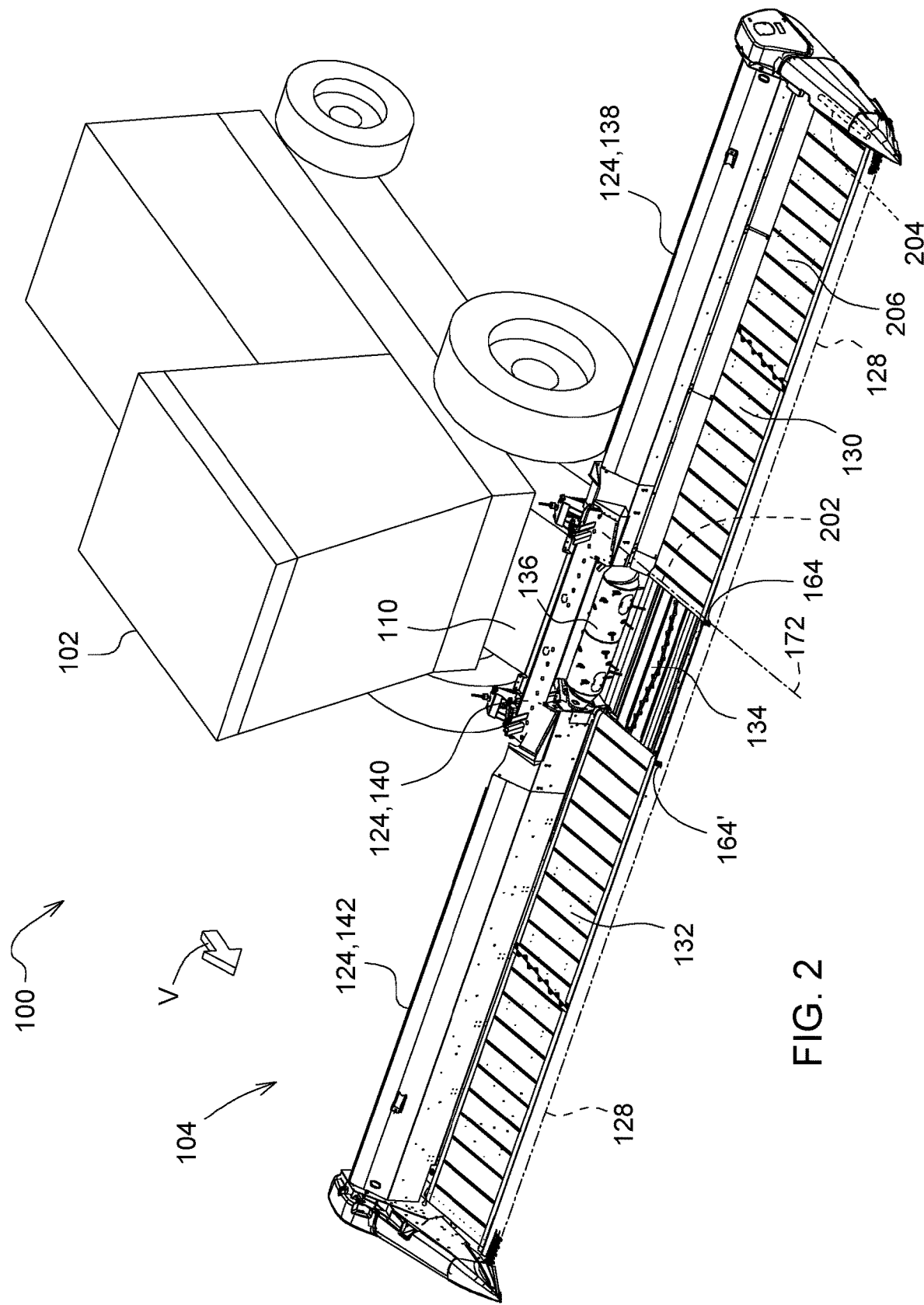
FIG. 2 illustrates the agricultural harvester of FIG. 1 in perspective view and showing details of the agricultural harvesting head.
Figure 3:
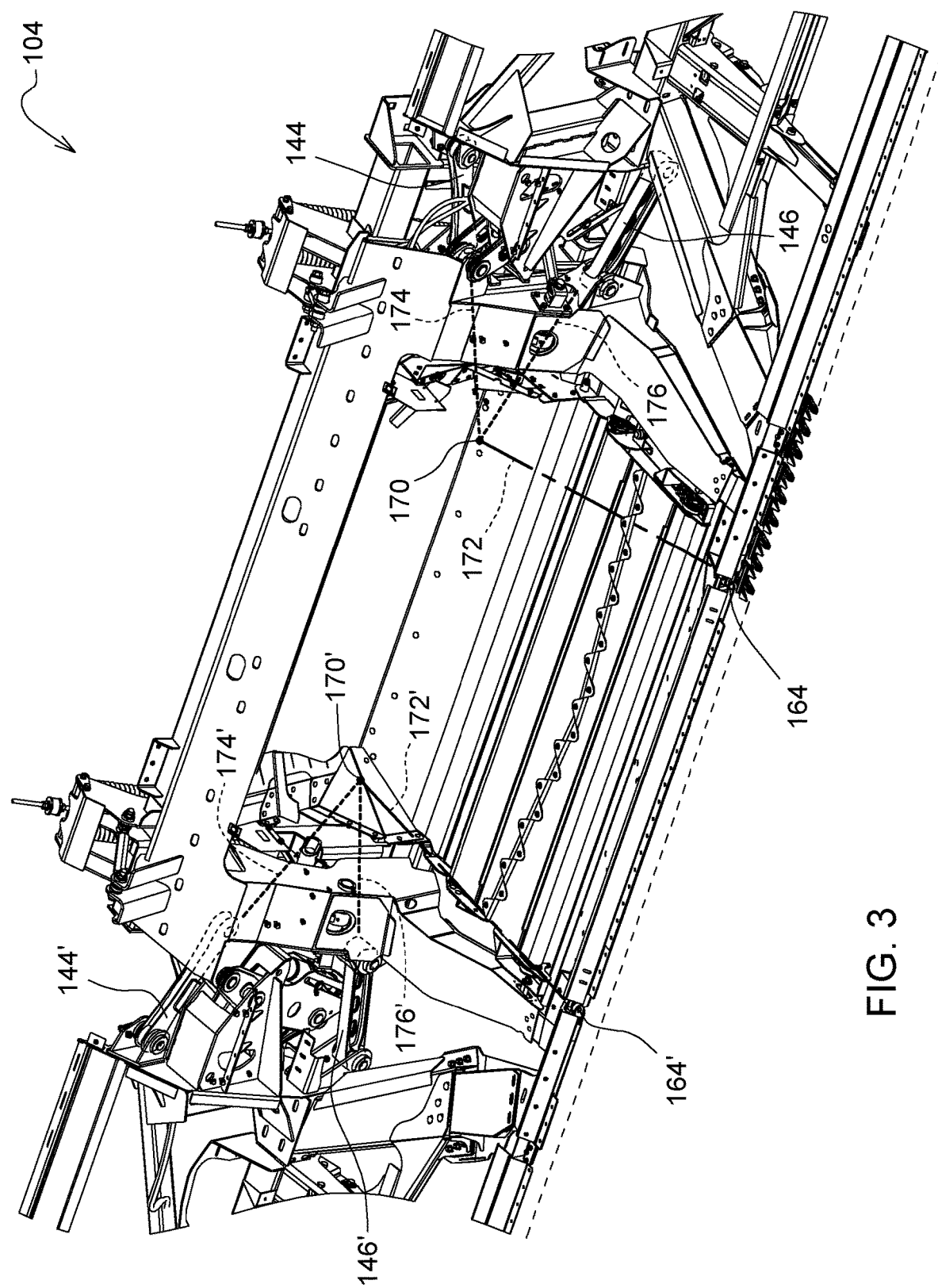
FIG. 3 is a fractional front perspective view of the frames of the agricultural harvester of FIGS. 1-2 with the conveyors removed.
Figure 4:
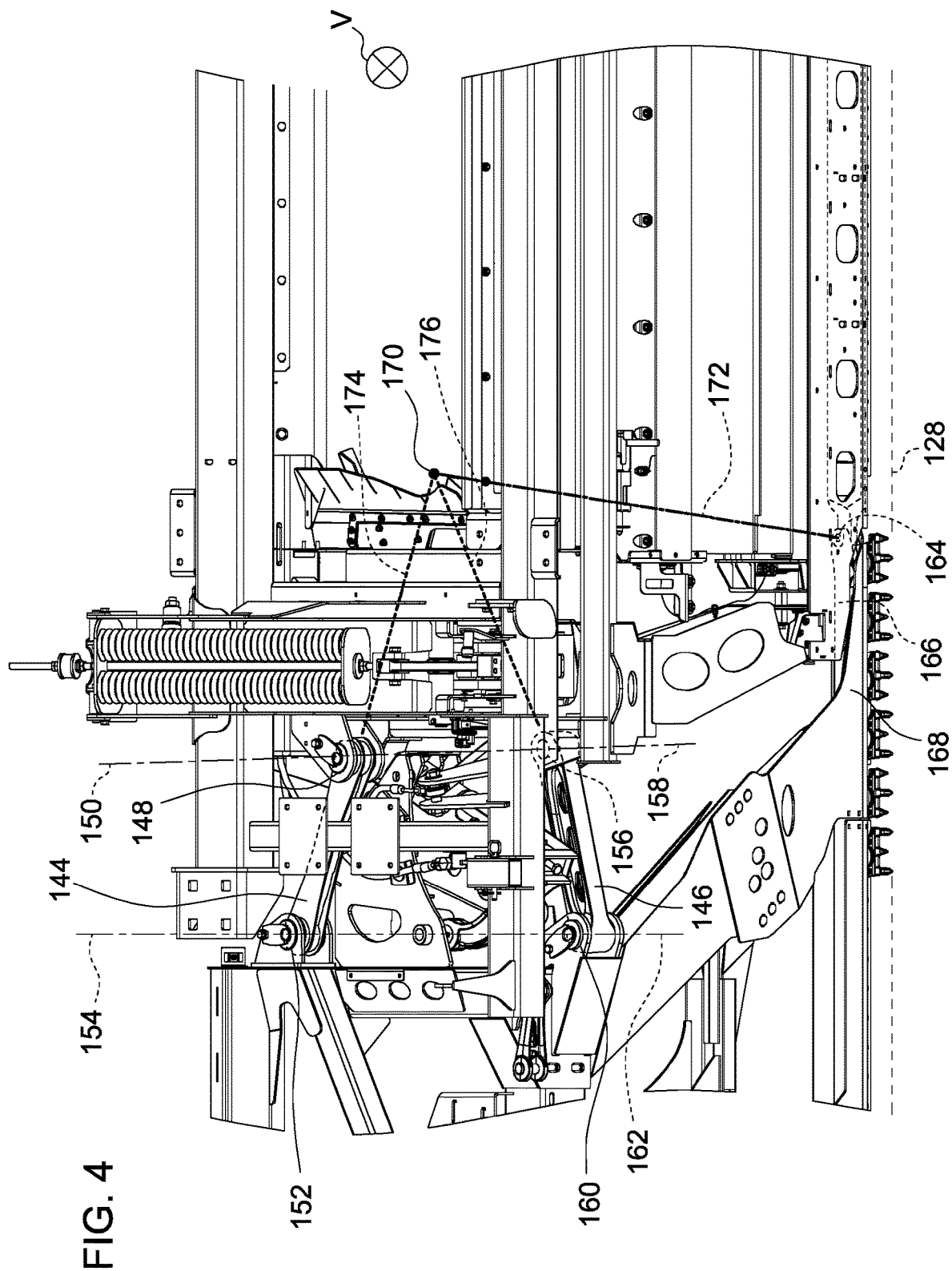
FIG. 4 is a fractional front perspective view of the view of the center frame and adapter frame shown in FIG. 3.
Figure 5:
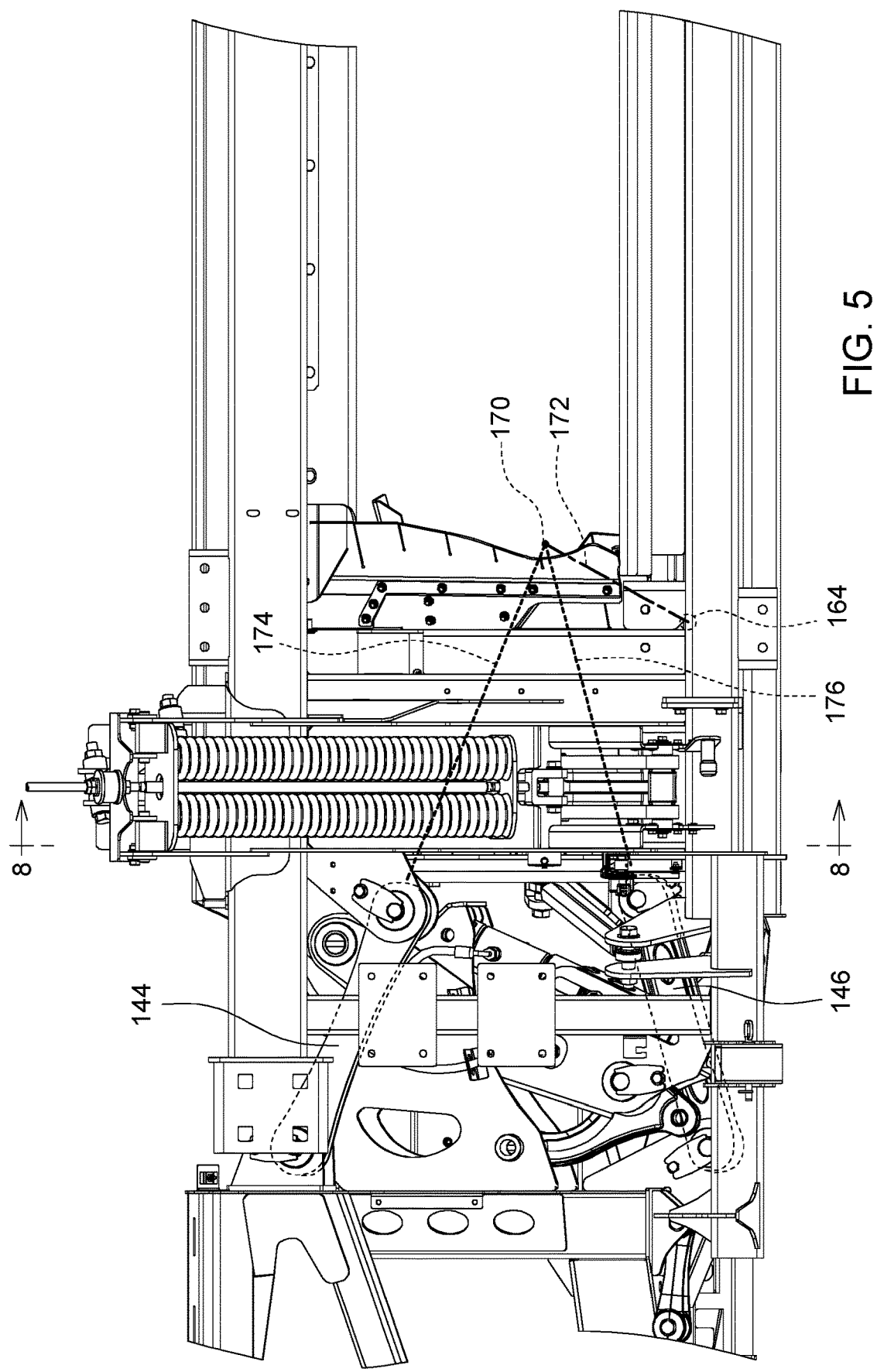
FIG. 5 is a slightly elevated fractional rear view of the frames shown in FIGS. 3-4.
Figure 6:
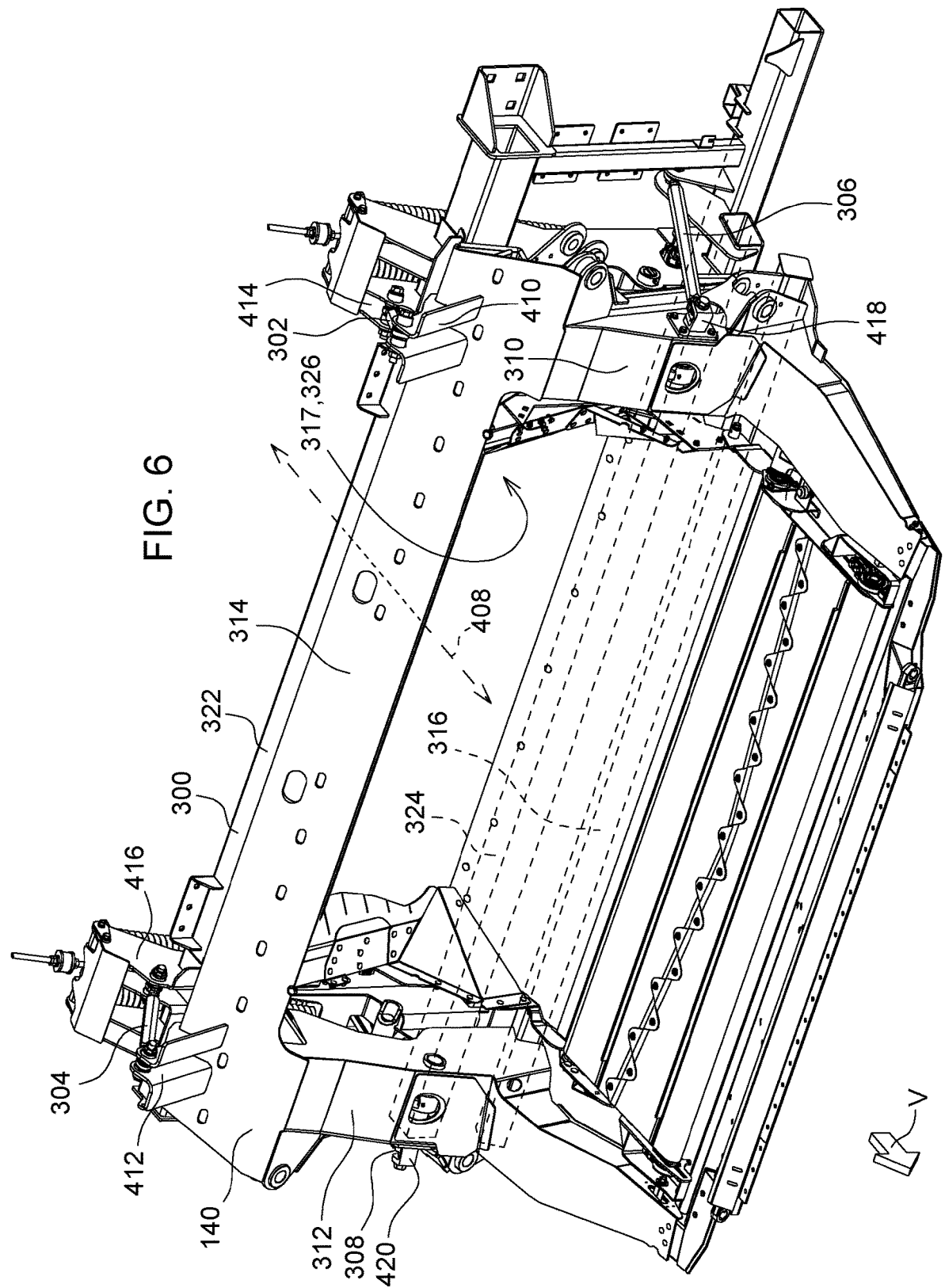
FIG. 6 is a fractional front perspective view of FIG. 3 with the left and right frames and linkages removed.

In FIG. 1, an agricultural harvester 100 comprises an agricultural combine 102 and an agricultural harvesting head 104. The agricultural combine 102 comprises a chassis 106 which is supported on four ground supports 108, as well as a threshing and separating system 112, a cleaning system 114, and a feederhouse 110 extending forward from the front of the agricultural combine 102. The agricultural combine 102 further comprises a grain storage chamber (also known as a "grain tank" or "grain reservoir") that is disposed at the top of the agricultural combine 102 and receives grain that has been threshed, separated, and cleaned.

The agricultural combine 102 is a self-propelled vehicle which is driven over the ground by a power source such as electric motors or internal combustion engines. The ground supports 108 are preferably wheels or tracks. At least two of them are driven in rotation by motors to propel the agricultural combine 102 over the ground.

The feederhouse 110 is pivotally connected to the front of the agricultural combine and extends forward therefrom. The feederhouse 110 is generally in the form of a hollow and generally rectangular box having an endless belt conveyor disposed inside. The hollow rectangular box has an open forward end and an open rear end. The forward end of the feederhouse 110 defines a generally rectangular frame 116 that is configured to support the agricultural harvesting head 104. A front roller 118 is disposed immediately inside the frame 116. A corresponding rear roller 120 is disposed at the rear end of the feederhouse 110. The front roller 118 and the rear roller 120 support opposing ends of a conveyor belt 122. Each of the front roller 118 and the rear roller 120 may be in the form of a narrow shaft with a plurality of sprockets or gears that engage the inner surface of the conveyor belt 122. A rotary motor (electric or hydraulic) is coupled to the rear roller 120 to drive the rear roller 120 in rotation. This rotation causes the conveyor belt 122 to recirculate in an endless fashion around the front roller 118 and the rear roller 120. The conveyor belt 122 has protrusions, such as cleats or lugs that engage a top surface of a mat of cut crop (not shown) that is presented to the frame 116. The movement of the conveyor belt 122 draws the mat into the feederhouse and carries it upward on the floor of the feederhouse until it is conveyed through the open rear end of the feederhouse 110 and sent to the threshing, separating and cleaning systems of the agricultural combine 102. The frame 116 is generally rectangular and includes a top member and a bottom member that are generally parallel to each other, are spaced apart, and extend generally parallel to the longitudinal extent of the agricultural harvesting head 104, and extend horizontally. That extends side to side a bottom horizontal member that is parallel to the top horizontal member. The frame 116 also includes a left side member and a right side member that are parallel to each other, spaced apart, and extend vertically.

The agricultural harvesting head 104 includes a laterally extending main frame 124 that extends perpendicular to a fore-and-aft harvesting direction of travel "V" of the agricultural harvester 100 and perpendicular to the longitudinal axis of the agricultural combine 102. The agricultural harvesting head 104 further includes an elongate reciprocating knife 128 that extends across almost the entire width of the agricultural harvesting head 104. This reciprocating knife is disposed immediately in front of three cut crop conveyors. These three cut crop conveyors include a left side conveyor 130 that carries cut crop from the left side of the agricultural harvesting head 104 to a central region of the agricultural harvesting head 104, a right side conveyor 132 that carries crop from the right side of the agricultural harvesting head 104 to the central region of the agricultural harvesting head 104, and a central conveyor 134 that receives crop from the left side conveyor 130 and the right side conveyor 132, and conveys the cut crop rearward and underneath a drum conveyor 136. Each of these three conveyors is an endless belt conveyor and is disposed immediately behind the reciprocating knife 128 to receive crop cut by the reciprocating knife 128.

The laterally extending main frame 124 includes three frame sections that are coupled together to pivot with respect to each other about fore-and-aft extending axes. Left frame section 138 extends from the outer left end of the agricultural harvesting head to a central region of the agricultural harvesting head 104. Center frame section 140 extends across a middle portion of the agricultural harvesting head 104. Right frame section 142 extends from the outer right end of the agricultural harvesting head 104 to the central region of the agricultural harvesting head 104.

The left side of conveyor 130 is supported on the left frame section 138. Several rollers, including a proximal roller 202 adjacent to the center frame section 140 and distal roller 204 adjacent to the leftmost end of the left frame section 138 are provided to support an endless belt 206. A motor (not shown) drives the proximal roller 202 in rotation. The proximal roller 202 recirculates in turn the endless belt 206 about the proximal roller 202 and the distal roller 204. Crop material cut by the reciprocating knife 128 in front of the left frame section 138 falls upon the top surface of the endless belt 206 and is drawn toward the center frame section 140. The inner end of the left frame section 138 is connected to the center frame section 140 to pivot up and down at its outer end with respect to the center frame section 140. The inner end of the right frame section 142 is connected to the center frame section 140 to pivot up and down at its outer end with respect to the center frame section 140.

An upper left link 144 and a lower left link 146 extend between and couple the left frame section 138 and the center frame section 140. An identically constructed and mirror image upper right link 144' and a lower right link 146' extend between and couple the right frame section 142 in the center frame section 140.

A proximal end of the upper left link 144 is coupled to the center frame section 140 by a first pivot joint 148 and is configured to pivot with respect to the center frame section 140 about a first axis 150 that extends generally in the direction of travel "V".

An opposing distal end of the upper left link 144 is coupled to the left frame section 138 by a second pivot joint 152 and is configured to pivot with respect to the left frame section 138 about a second axis 154 that extends in the direction of travel "V".

A proximal end of the lower left link 146 is coupled to the center frame section 140 by a third pivot joint 156 and is configured to pivot with respect to the center frame section 140 about a third axis 158 that extends in the direction of travel "V".

An opposing distal end of the lower left link 146 is coupled to the left frame section 138 by a fourth pivot joint 160 and is configured to pivot with respect to the left frame section 138 about a second axis 162 that extends in the direction of travel "V".

A hinge joint 164 is disposed adjacent to the reciprocating knife 128 at a forward edge of the agricultural harvesting head 104. The hinge joint 164 couples a forwardly extending member 166 of the center frame section 140 to a forwardly extending member 168 of the left frame section 138.

An identically constructed and mirror image hinge joint 164' is disposed adjacent to the reciprocating knife 128 and forward edge of the agricultural harvesting head 104. The hinge joint 164' couples a forwardly extending member of the center frame section 142 a forwardly extending member of the right frame section 138.

The attachment points of the proximal ends of the upper left link 144 and the lower left link 146 are closer together (as measured in a vertical direction) than the attachment points of the distal ends of the upper left link 144 and the lower left link 146.

The two attachment points of the upper left link 144 define a first construction line 174 extending through both of the attachment points of the upper left link 144. The two attachment points of the lower left link 146 define a second construction line 176 extending through the attachment points of the lower left link 146.

The first construction line and the second construction line are not parallel. When viewed from the rear of the agricultural harvesting head 104 they intersect each other at a point of intersection 170. Whenever the left frame section 138 pivots up and down with respect to the center frame section 140, these sections pivot with respect to each other about the point of intersection 170.

Since the right side of the agricultural harvesting head 104 is identically constructed (but in mirror image fashion) as the left side, the same intersection, pivot line, 1st construction line, and second construction line are also provided on the right side of the agricultural harvesting head 104 and are denoted with the numbers 170', 172', 174' and 176'.

In the illustrated example, the point of intersection 170 is located closer to the longitudinal and vertical midplane of the center frame section 140 than all four of the attachment points of the upper left link 144 and the lower left link 146 to the left frame section 138 and the center frame section 140.

The pivoting axis of the hinge joint 164 is disposed forward of and slightly below the point of intersection 170 of the two construction lines. Thus, the left frame section 138 is constrained by the hinge joint 164, the upper left link 144 and the lower left link 146 to pivot with respect to the center frame section 140 about a pivot line 172 that extends through the point of intersection 170 and through the pivoting axis of the hinge joint 164. The pivot line 172 also extends through or immediately adjacent to the reciprocating knife 128. In this manner, whenever the left frame section 138 pivots with respect to the center frame section 140, the reciprocating knife 128 (which extends across both the left frame section 138 and the center frame section 140) can flex without being torn apart.

The reciprocating knife 128 is typically close to the ground where it can sever plant stalks close to the ground.

The rear portion of the three frame sections, the upper left link 144 and the lower left link 146 are commonly elevated above the ground to provide ground clearance. For this reason, the pivot line 172 extends forward and slightly downwardly from the point of intersection 170 to the hinge joint 164.

The left side conveyor 130 is supported on the left frame section 138. The left side conveyor 130 includes several rollers that support an endless belt 206 for recirculating movement around the rollers. The several rollers include a proximal roller 202 that is located adjacent to the center frame section 140 and distal roller 204 that is located adjacent to the leftmost end of the left frame section 138.

The pivot line 172 extends through the proximal roller 202. The rotational axis of the proximal roller 202 is collinear with the pivot line 172. Thus, when the left frame section 138 pivots up and down with respect to the center frame section 140, the proximal roller 202 does not move with respect to the left frame section 138 and the center frame section 140. Further, since the frame sections do not move with respect to each other, the left side conveyor 130 and the central conveyor 134 do not move with respect to each other as well.

A rotary motor (not shown) is coupled to and drives the proximal roller 202 in rotation, which in turn recirculates an endless belt 206 about the proximal roller 202 and the distal roller 204. Crop material cut by the portion of the reciprocating knife 128 located in front of the left frame section 138 falls upon the top surface of the endless belt 206 and is drawn toward the center frame section 140.

The center frame section 140 is illustrated coupled to and supported on an adapter frame 300. The adapter frame 300 is in turn coupled to and supported on the feederhouse frame 116. Four links, including an upper left link 302, an upper right link 304, a lower left link 306, and a lower right link 308 are coupled to and between the center frame section 140 and the adapter frame 300. A forward end of each of the four links is coupled to the center frame section 140 and a rear end of each of the four links is coupled to the adapter frame 300. The four links extend fore-and-aft.

The center frame section 140 is generally rectangular and extends vertically and transverse to the direction of travel "V". It has two laterally spaced apart vertical side members 310, 312, an upper horizontal member 314 that is fixed at both ends to an upper portion of the side members 310, 312, and a lower horizontal member 316 that is fixed at both ends to a lower portion of the side members 310, 312. The lower horizontal member 316 is spaced apart and disposed below the upper horizontal member 314. The side members 310, 312 are parallel to each other. The upper horizontal member 314 and the lower horizontal member 316 are parallel to each other. These four members 310, 312, 314, 316 are fixed together to define a rigid rectangular frame having a central aperture 317 configured to receive and transmit all the cut crop harvested by the agricultural harvesting head 104.

The adapter frame 300 is generally rectangular and extends vertically and transverse to the direction of travel "V". It has two laterally spaced apart vertical side members 318, 320, an upper horizontal member 322 that is fixed at both ends to an upper portion of the side members 318, 320, and lower horizontal member 324 that is fixed at both ends to a lower portion of the side members 318, 320. The lower horizontal member 324 is spaced apart and disposed below the upper horizontal member 322. The side members 318, 320 are parallel to each other. The upper horizontal member 322 and the lower horizontal member 324 are parallel to each other. These four members 318, 320, 322, 324 are fixed together to define a rigid rectangular frame having a central aperture 326 that is configured to receive and transmit all the cut crop material harvested by the agricultural harvesting head 104, and in particular to receive all the cut crop material conveyed through the central aperture 317 of the center frame section 140. The four links 302, 304, 306, 308 extend between and are coupled to the center frame section 140 and the adapter frame 300. The two lower links 306, 308 have the same length. Each of the four links 302, 304, 306, 308 are preferably formed as turnbuckles with threaded ball joints at each end to permit the length of the links (and thus the angle of the mainframe 124) to be readily adjusted for a variety of crops.

The four links are coupled at their forward ends to the center frame section 140 and at their rear ends to the adapter frame 300. The pivot joints that couple the links to the frames permit the frames to move up and down with respect to each other, and permit the frames to rotate with respect to each other about an axis 408 that extends in a fore-and-aft direction. This axis extends through the central apertures of both the center frame section 140 and the adapter frame 300.

The upper links (links 302, 304) are spaced apart and are pivotally coupled at their forward ends to brackets 410, 412, respectively. Brackets 410, 412 are fixed to and extend upward from the upper horizontal member 314. The brackets are spaced apart on the upper horizontal member 314. Bracket 410 is fixed to the upper horizontal member 314 adjacent to the upper end of the vertical side member 310. Bracket 412 is fixed to the upper horizontal member 314 adjacent to the upper end of the vertical side member 312.

The upper links (links 302, 304) are spaced apart and are pivotally coupled at their rear ends to brackets 414, 416, respectively. Brackets 414, 416 are fixed to and extend upward from the upper horizontal member 322 of the adapter frame 300. The brackets are spaced apart on the upper horizontal member 322. Bracket 414 is fixed to the upper horizontal member 322 adjacent to the upper end of the vertical side member 318. Bracket 416 is fixed to the upper horizontal member 322 adjacent to the upper end of the vertical side member 320.

Figure 7:
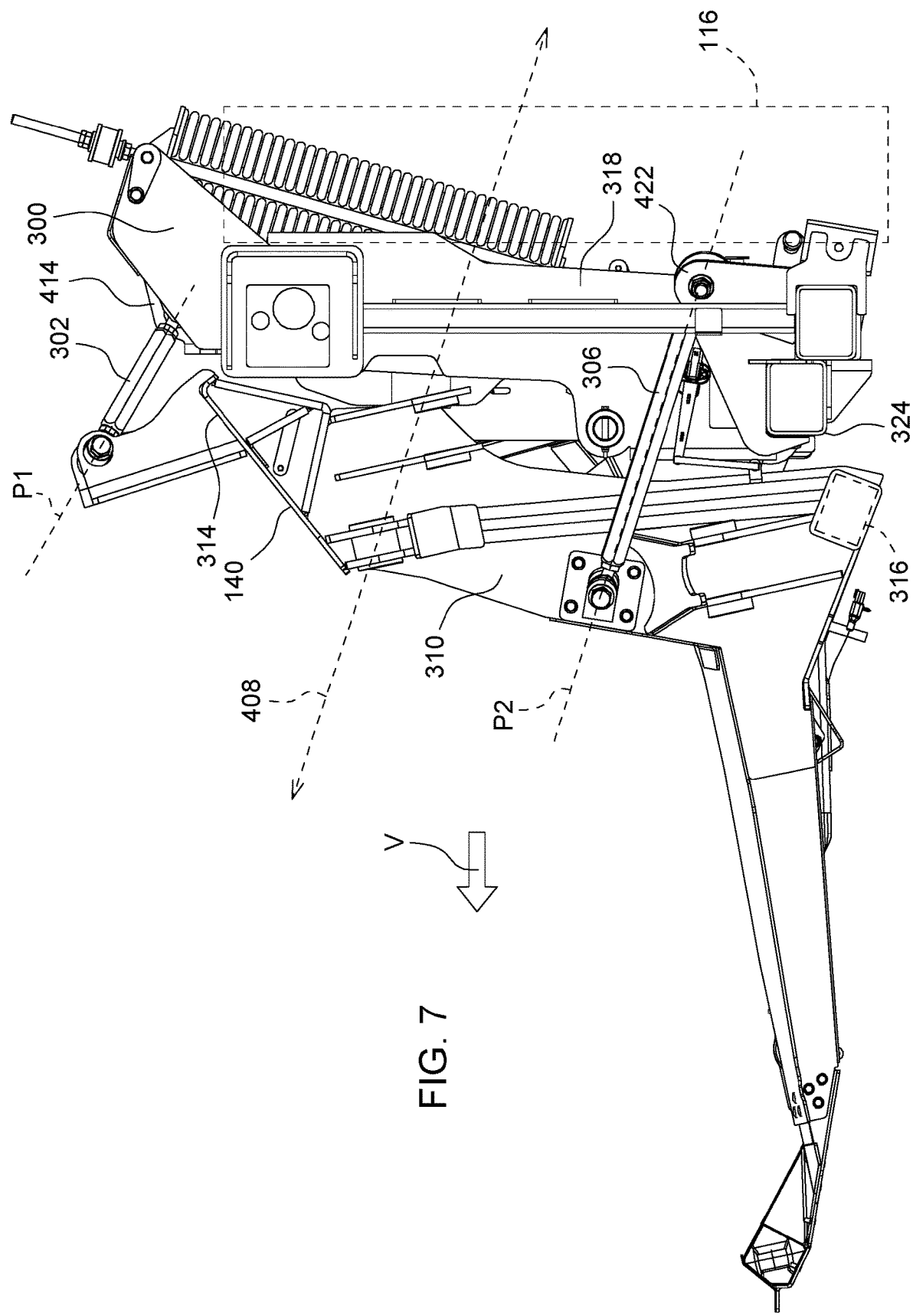
FIG. 7 is a left side view of the arrangement illustrated in FIG. 6.

The two upper links 302, 304 have the same length between their pivot connections to the frames at each end. The two upper links 302, 304 lie in a first common plane "P1" (see FIG. 7).

The lower links (links 306, 308) are spaced apart and are pivotally coupled at their forward ends to brackets 418, 420, respectively. Bracket 418 is fixed to and extends laterally outward from a lower portion of vertical side member 310 adjacent to the left end of lower horizontal member 316. Bracket 420 is fixed to and extends laterally outward from a lower portion of vertical side member 312 adjacent to the right end of lower horizontal member 316.

The lower links (links 306, 308) are spaced apart and are pivotally coupled at their rear ends to brackets 422, 424, respectively. Bracket is fixed to and extends upward from a lower left portion of adapter frame 300. Bracket 424 is fixed to and extends upward from a lower right portion of adapter frame 300. The two lower links 306, 308 have the same length between their pivot connections to the frame at each end.

The two lower links 306, 308 have the same length between their pivot connections to the frames at each end. The two lower links 306, 308 lie in a second common plane.

Figure 8:
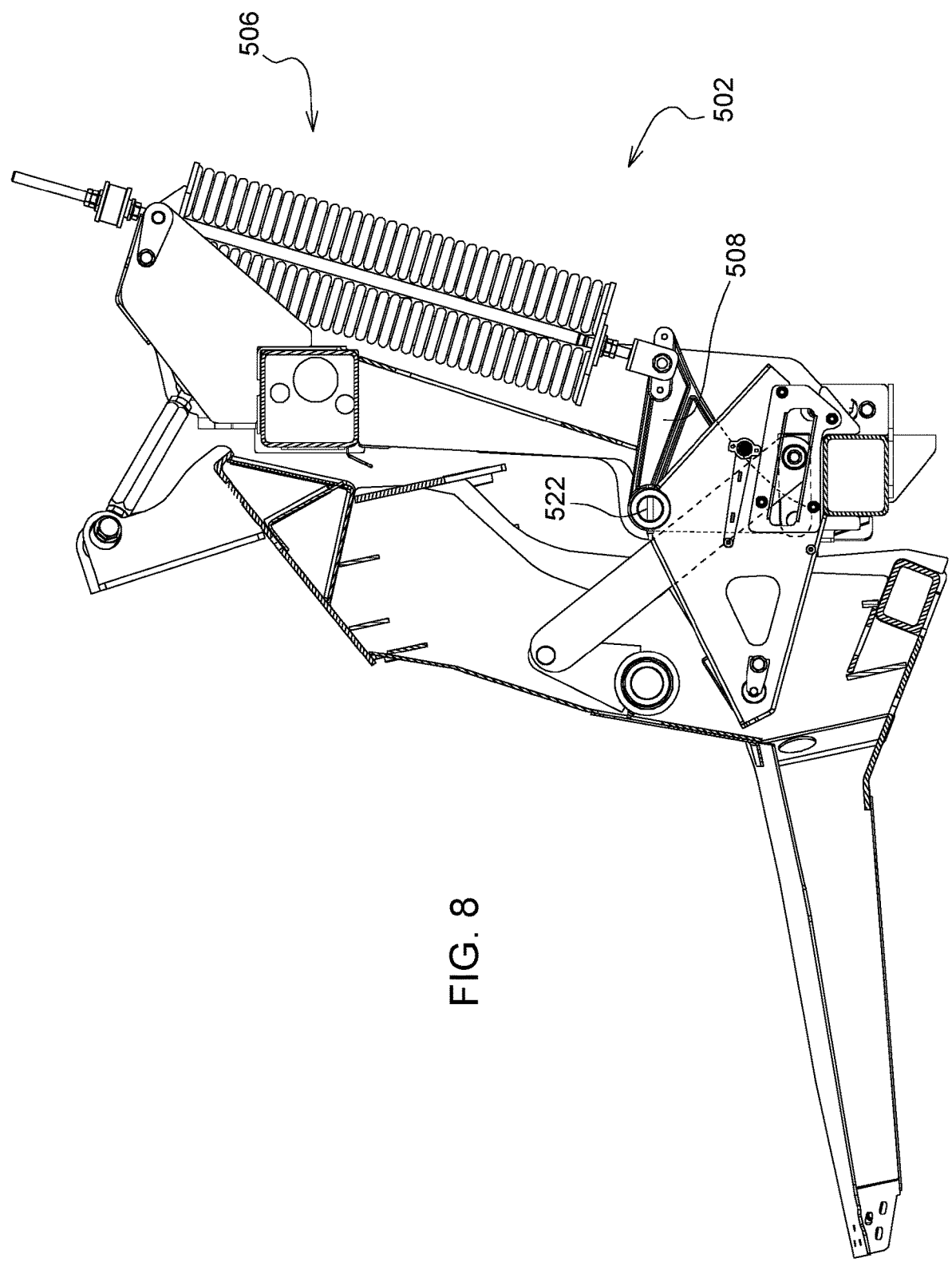
FIG. 8 is a fragmentary left side view of the constant force linkage taken at section line 8-8 in FIG. 5.

When viewing the center frame section 140 and the adapter frame 300 from the rear (e.g. as in FIG. 8), the links 302, 304, 306, 308 are disposed at the upper left, upper right, lower left, and lower right corners of the apertures 317, 326. The links collectively surround the apertures 317, 326.

All four of the links 302, 304, 306, 308 extend generally fore-and-aft and are generally parallel. However, they are not perfectly parallel, nor do they extend perfectly fore-and-aft. In fact, they are slightly nonparallel in order to provide particular benefits that four perfectly parallel links would not provide.

In particular, the two upper links 302, 304 extend forward and outward. Thus, the distance between the two upper links at their pivotal attachment points on the center frame section 140 is greater than the distance between the two upper links at their pivotal attachment points on the adapter frame 300.

The two lower links 306, 308 extend forward and inward. Thus, the distance between the two lower links at their attachment points on the center frame section 140 is less than the distance between the two lower links at their attachment points on the adapter frame 300.

By arranging the spacing of the attachment points (and therefore the direction the two upper links and the two lower links extend) as shown, the center frame section 140 and the adapter frame 300 cannot be translated side to side with respect to each other. If a great force was applied to force side to side (lateral) translation of the two frames with respect to the other, either one or more of the links will break and/or one or more of the frames will break. The links and the frames are robust enough that during normal operation no such lateral translation nor any link or frame breakage will occur under normal operational loading.

Constant Force Linkage

A constant force assembly 500 couples the adapter frame 300 to the main frame 124, and particularly to the center frame section 140 of the main frame 124. The constant force assembly 500 supports the weight of the main frame 124 and its associated components on the adapter frame 300, such that the main frame 124 is partially or fully suspended in a floating position on links 302, 304, 306, 308.

In normal operation, the operator will adjust the constant force assembly 500 to provide a large lifting force on the center frame section 140 that support substantially the entire weight of the agricultural harvesting head 104. The operator will adjust this large lifting force such that the ground force acting upward against the bottom of the agricultural harvesting head 104 is quite small.

The operator desires that the ground force stays relatively constant. If the ground force increases, it may cause the reciprocating knife 128 to dig into the ground. If the ground force decreases the reciprocating knife 128 may be lifted entirely off the ground, away from the plant stalks it is supposed to cut.

The constant force assembly 500 applies a constant upward force against the main frame 124 in a wide range of operating positions, and therefore maintains a constant ground force against the ground.

The constant force assembly 500 includes a left side constant force assembly 502 and right side constant force assembly 502'. The left side constant force assembly 502 extends between and couples the adapter frame 300 and the center frame section 140 on the left side of the adapter frame 300. The right side constant force assembly 502' extends between and couples the adapter frame 300 and the center frame section 140 on the right side of the adapter frame 300. The two assemblies 502, 502' are identically constructed and are mirror images of each other. Therefore the construction and operation of the left side constant force assembly 502 is the same as the right side constant force assembly 502'. For ease of description, we will only describe the left side constant force assembly 502.

The left side constant force assembly 502 includes a spring 506, a bell crank 508, a first connecting link 510, a scissor link assembly 512 and a second connecting link 514.

The spring 506 is oriented in a generally vertical position and includes two springs 516, 518 mounted in parallel. The upper end of the spring 506 is connected to a bracket 520 that is fixed to an upper portion of the adapter frame. The lower end of the spring 506 is pivotally coupled to the bell crank 508. The bell crank 508 is supported on the adapter frame at a pivot joint 522 to pivot with respect to the adapter frame. As the spring 506 is compressed and released, moving in a generally vertical direction, the other end of the bell crank moves in a generally horizontal direction and fore-and-aft direction. The bell crank functions to change the direction of the force applied by the spring 506 from a vertical direction to a horizontal direction.

The bell crank 508 is pivotally coupled to a forward end of the first connecting link 510 to apply the spring force to the forward end of the first connecting link 510. The rear end of the first connecting link 510 is slidingly supported in a slot 524 formed in the adapter frame 300. As the spring 506 is compressed and released, the first connecting link 510 is constrained to move rearward and forward, respectively, in the slot 524.

The rear end of the first connecting link 510 is pivotally coupled to a lower end of the scissor link assembly 512. The scissor link assembly 512 includes a first link 526 and a second link 528. Slot 524 constrains the rear end of the first connecting link 510 and the lower end of the scissor link assembly 512 to translate in the slot 524.

One end of the second link 528 is pivotally coupled to the midpoint of the first link 526 to pivot about a pivot joint 534. The other end of the second link 528 is pivotally coupled to the adapter frame 300 to pivot with respect to the adapter frame 300 about a pivot joint 532.

The lower end of the first link 526 is pivotally coupled to the rear end of the first connecting link 510 at a pivot joint 538 to pivot with respect to each other about an axis 536. The pivot joint 538 defined by this pivotal coupling is constrained to stay within and translate back and forth in the slot 524.

The upper end of the first link 526 is pivotally coupled to the upper end of the second connecting link 514 such that the first link 526 can pivot with respect to the second connecting link 514 about axis 540. The lower and opposing end of connecting link 514 is pivotally coupled to center frame section 140.

Figure 9:
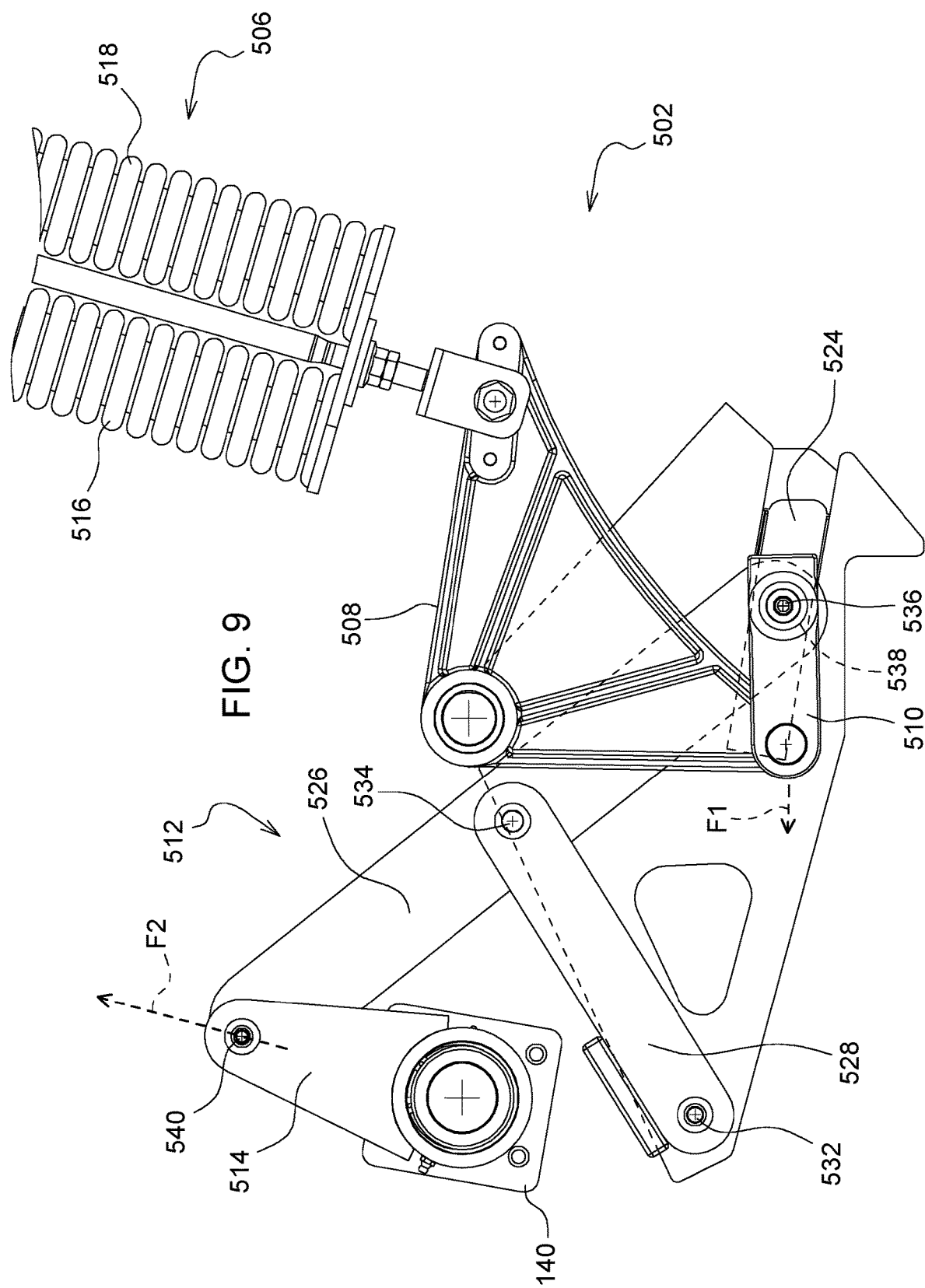
FIG. 9 is a fragmentary left side view of the constant force linkage of FIG. 8.

Force "F2" (FIG. 9) is the upward force applied by the constant force linkage 500. It extends upwardly and in a direction generally parallel to the longitudinal extent of the second connecting link 514. Force "F1" (FIG. 9) is the force applied by the spring 506, through the bell crank, to the first connecting link.

Force "F1" changes with the degree of compression of spring 506. The more compressed the spring 506 is, the higher the center frame section 140 is, and the greater the spring force "F1". At the same time the spring 506 is compressed, however, the scissor link assembly 512 flattens out. First link 526 rotates counterclockwise as its lower end translates rearward in the slot 524. Second link 528 rotates clockwise as its rear end pivots downward.

This flattening out of the scissor link assembly 512 reduces the mechanical advantage of the spring 506, causing only a portion of the now-increased spring force "F1" to be communicated to the second connecting link 514. If the lengths of the links are chosen as illustrated herein, force "F2" will remain constant as the center frame section 140 moves up and down, even as the force "F1" provided by spring 506 changes significantly during the same movement.

In the discussion above, various components and axes are described as extending in a fore-and-aft direction, or extending in a direction parallel to a direction of travel "V", or extending horizontally or longitudinally, or extending laterally. During normal operation, these components are expected to move. Typically, they can be pivoted or tilted with respect to each other, with respect to the ground, or with respect to the combine during normal operation and therefore are not precisely horizontal, vertical, longitudinally extending or laterally extending in all positions during operation.

The description above is provided to illustrate one or more ways of making the invention. Other ways of making the invention are possible. The invention is defined by the claims.

The invention claimed is:

1. An agricultural harvesting head for an agricultural harvester, where the agricultural harvester has a feederhouse extending forward from the front of the agricultural harvester and wherein the feederhouse is configured to support the agricultural harvesting head on a forward end thereof, the agricultural harvesting head comprising:
   an elongate mainframe extending laterally and perpendicular to a direction of travel of the agricultural harvester when harvesting crops, wherein the elongate mainframe has a first central aperture through which cut crop material is passed;
   an adapter frame disposed behind the center frame section, wherein the adapter frame is configured to be removably coupled to and supported on the front end of the feederhouse and wherein the adapter frame has a second central aperture configured to receive the cut crop from the first central aperture and to communicate the cut crop into a front opening of the feederhouse;
   a plurality of links coupling the mainframe and the adapter frame to permit the mainframe to move up and down with respect to the adapter frame through a plurality of relative positions between the adapter frame and the mainframe; and
   a constant force assembly configured to apply a lifting force to the elongate mainframe,
   wherein the constant force assembly comprises at least one spring having a first end coupled to the adapter frame and a second end coupled to a first end of a scissor link assembly, and wherein as the mainframe travels through the plurality of relative positions the lifting force remains constant while a force provided by the at least one spring to the scissor link assembly does not remain constant.

2. The agricultural harvesting head of claim 1, wherein the constant force assembly is coupled to the adapter frame and to the mainframe and communicates a lifting force from the adapter frame to the mainframe.

3. The agricultural harvesting head of claim 1, wherein a second end of the scissor link assembly is coupled to the mainframe.

4. The agricultural harvesting head of claim 1, wherein the scissor link assembly is configured to change the mechanical advantage of the spring acting upon the mainframe.

5. The agricultural harvesting head of claim 1, wherein a change in compression of the spring adjusts the scissor link assembly.

6. The agricultural harvesting head of claim 5, wherein the change in compression of the spring is an increase in compression of the spring and wherein the increase in compression of the spring adjusts the scissor link assembly to reduce the mechanical advantage of the spring acting upon the mainframe.

7. The agricultural harvesting head of claim 5, wherein the change in compression of the spring is a decrease in compression of the spring and wherein the decrease in compression of the spring adjusts the scissor link assembly to increase the mechanical advantage of the spring acting upon the mainframe.

8. An agricultural harvesting head for an agricultural harvester, where the agricultural harvester has a feederhouse extending forward from the front of the agricultural harvester and wherein the feederhouse is configured to support the agricultural harvesting head on a forward end thereof, the agricultural harvesting head comprising:

an elongate mainframe extending laterally and perpendicular to a direction of travel of the agricultural harvester when harvesting crops, wherein the elongate mainframe has a first central aperture through which cut crop material is passed;

an adapter frame disposed behind the center frame section, wherein the adapter frame is configured to be removably coupled to and supported on the front end of the feederhouse and wherein the adapter frame has a second central aperture configured to receive the cut crop from the first central aperture and to communicate the cut crop into a front opening of the feederhouse;

a plurality of links coupling the mainframe and the adapter frame to permit the mainframe to move up and down with respect to the adapter frame through a plurality of relative positions between the adapter frame and the mainframe; and a constant force assembly configured to apply a lifting force to the elongate mainframe that remains constant in magnitude as the mainframe travels through the plurality of relative positions.

9. An agricultural harvesting head for an agricultural harvester, where the agricultural harvester has a feederhouse extending forward from the front of the agricultural harvester and wherein the feederhouse is configured to support the agricultural harvesting head on a forward end thereof, the agricultural harvesting head comprising:

an elongate mainframe extending laterally and perpendicular to a direction of travel of the agricultural harvester when harvesting crops, wherein the elongate mainframe has a first central aperture through which cut crop material is passed;

an adapter frame disposed behind the center frame section, wherein the adapter frame is configured to be removably coupled to and supported on the front end of the feederhouse and wherein the adapter frame has a second central aperture configured to receive the cut crop from the first central aperture and to communicate the cut crop into a front opening of the feederhouse; and a constant force assembly including at least one spring having a first end coupled to the adapter frame and a second end coupled to a bell crank pivotally coupled to a forward end of a first connecting link, a rear end of which is slidingly supported in a slot formed in the adapter frame and pivotally coupled to a first end of a scissor link assembly, wherein the slot constrains the rear end of the first connecting link and first end of the scissor link assembly to translation therewithin, the scissor link assembly configured to change the mechanical advantage of the spring acting upon the elongate mainframe such that the scissor link assembly will apply a lifting force to the elongate mainframe that remains constant with an increase or decrease in compression of the spring.

* * * * *